United States Patent Office 3,591,520
Patented July 6, 1971

1

3,591,520
QUATERNARY ADDUCTS OF POLYEPIHALO-
HYDRIN AND USE THEREOF
Myron T. McDonald, Houston, Tex., assignor to Nalco
Chemical Company, Chicago, Ill.
No Drawing. Filed Jan. 17, 1968, Ser. No. 698,441
Int. Cl. B01d 17/04
U.S. Cl. 252—329
13 Claims

ABSTRACT OF THE DISCLOSURE

Fully quaternized adducts of tertiary alkyl amines and polyepihalohydrins are prepared by reacting liquid polyepihalohydrins, preferably polyepichlorohydrin having a molecular weight of at least 3000, with tertiary lower alkylamines and/or oxyalkylated lower dialyklamines. These products are highly water soluble and are compatible with zinc chloride solutions. They are especially useful when added to aqueous zinc chloride solutions or such solutions containing other metal salts for breaking oil-in-water emulsions.

---

It is disclosed in the art to prepare partial quaternary ammonium adducts of polyepichlorohydrin. The preparation of such compositions is described in U.S. 3,320,317. In these compositions a portion of the chlorine in the polyepichlorohydrin is quaternized by reaction with a lower alkylamine, such as trimethylamine or triethylamine. The resultant products are said to be soluble in water and to be useful as coagulants, especially for raw sewage, These products are said to have molecular weights of from about 600 to about 100,000 but in the examples given in said patent the molecular weight of the polyepichlorohydrin varies from 500 to 1500.

It is known, as disclosed in U.S. 3,158,580, that solid polyepihalohydrins can be prepared which are amorphous polymers with elastomeric properties that can be vulcanized to produce rubbers. These products are prepared by polymerizing an epihalohydrin in the presence of an organoaluminum catalyst, for example, triisobutyl aluminum. These products are water insoluble.

It has also been known heretofore in the art to use solutions of zinc chloride with or without other salts, such as calicum chloride, for the purpose of breaking oil-in-water petroleum emulsions. These emulsions are sometimes referred to as reversed emulsions and occur in petroleum bearing subterranean formations where substantial quantities of water are also present. Most petroleum producing formations have limited quantities of water present and when the oil is produced the water is mingled with the petroleum to produce a water-in-oil emulsion. It is then necessary to remove the water and various methods have been devised for this purpose, the most common of which is chemical treatment. Chemical treatment has also been used in removing water from oil-in-water emulsions but due to the larger proportions of water present and the manner in which it is associated with the oil, many difficulties have been encountered in separating the water from oil-in-water emulsions by chemical treatment.

One of the objects of the present invention is to provide new and improved fully quaternized adducts of tertiary amines and polyepihalohydrins which are especially useful for breaking oil-in-water petroleum emulsions and which are also useful for other purposes.

Another object of the invention is to prepare new and useful polyelectrolytes which are compatible with aqueous salt solutions and especially relatively concentrated aqueous solutions of zinc chloride. Other objects will appear hereinafter.

2

In accordance with the invention new and useful quaternary adducts of polyepihalohydrins with tertiary amines are prepared which have the following general formula:

(I) 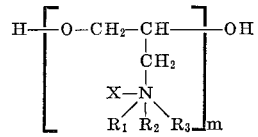

where X is halogen (e.g., chlorine, bromine or iodine), $R_1$, $R_2$ and $R_3$ are methyl, ethyl or $H\text{-}(OC_nH_{2n})_y$, $y$ is 1 to 30, and $m$ is a value sufficient to give a liquid product soluble in an aqueous solution of zinc chloride containing at least 10% zinc chloride. In most cases $m$ will be within the range of 30 to 80. $n$ is two to four.

These products are prepared by reacting a polyepihalohydrin, preferably polyepichlorohydrin, with a tertiary lower alkylamine, such as trimethylamine or triethylamine or an oxyalkylated lower dialkylamine such as oxyalkylated dimethylamine or oxyalkylated diethylamine. Temperatures within the range of 100° C. to 150° C. are normally used for the quaternization reaction and where the quaternizing amine is volatile, the reaction is carried out in a closed vessel under the pressure produced by the reactants. Where the quaternizing amine is triethylamine, somewhat higher temperatures may be required. In carrying out the quaternization reaction it is preferable to use mixtures of trimethylamine and oxalkylated dimethylamine.

Where the oxyalkylated dialkylamine is used, the oxyalkylation is preferably effected with ethylene oxide in order to produce products that are completely water soluble. The solubility of the products in water can be varied by using other alkyl oxides, such as 1,2-propylene oxide or 1,2-butylene oxide. The oxyalkylation can also be effected with mixtures of ethylene oxide and 1,2-propylene oxide or with mixtures of 1,2-butylene oxide and ethylene oxide. However, the propylene oxide or the butylene oxide can be reacted with the secondary amine, such as dimethylamine or diethylamine, followed by the sequential addition of ethylene oxide. As indicated by Formula I, as little as one mole of alkylene oxide and as much as 30 moles of alkylene oxide can be used in oxyalkylating the secondary amine to produce a tertiary amine containing both oxyalkylene groups and lower alkyl groups.

The polyepihalohydrin is preferably a polyepichlorohydrin having a minimum average molecular weight of about 3000 and which is liquid under the conditions of the quaternizing reaction. The preferred polyepihalohydrins are also liquid at ambient temperatures. The corresponding bromo-derivatives can be used but are usually impractical because of higher cost. The same is true of the iodine derivatives.

In order to prepare polyepichlorohydrins having a suitable molecular weight for use as a starting material, it is preferable to polymerize epichlorohydrin in the presence of an organoaluminum catalyst, preferably an alkyl aluminum catalyst containing 2 to 4 carbon atoms per alkyl group, such as, for example, triisobutyl aluminum, triethyl aluminum, diisobutyl aluminum chloride, monoisobutyl aluminum chloride, and aluminum isopropylate.

The invention will be further illustrated but is not limited by the following examples in which the quantities are stated in parts by weight, unless otherwise indicated.

EXAMPLE I 750 parts by weight epichlorohydrin (containing 0.64 part water) was placed in a reactor equipped with agitation and cooling under a nitrogen blanket. A solution of 25% triisobutyl aluminum in toluene was added in increments at 60° C. until evidence of exothermic reaction appeared. 28 parts was required to initiate the reaction.

The heat of reaction increased the temperature of the reaction mixture to 115° C. in 20 minutes. Temperature was maintained at 100° C. to 115° C. for 1½ hours with cooling. During this time an increase in the apparent viscosity of the reaction mixture occurred. After the reaction subsided to the extent that cooling was no longer required, incremental catalyst addition was resumed at 75° C. to 100° C. and 12 parts was added during a 3 hour period with the temperature maintained by the heat of the reaction. The temperature was maintained at 90° C. to 100° C. for an additional 1½ hours.

At the end of this period, 25 parts water was added to destroy residual catalyst, and the temperature was increased to 150° C. over a 1½ hour period to remove 106 parts condensate.

The residue was a pale amber viscous liquid which was soluble in toluene and xylene and insoluble in isopropyl alcohol.

EXAMPLE II 138 parts by weight of the product of Example I was placed in a pressure vessel equipped with agitation and heating along with 130 parts of a 3 mole ethylene oxide adduct of dimethylamine and 182 parts 25% solution of trimethylamine in water and heated at 100° C. for 17 hours, during which time the pressure fell from 47 p.s.i.g. to a slight vacuum in the reactor. The reaction mixture was neutralized to a pH of 5.1 with 23 parts of 30% hydrochloric acid.

A clear brown viscous liquid was obtained which was very soluble in water.

EXAMPLE III

In a vessel equipped with agitation was placed 145 parts by weight of the product of Example II, 355 parts of a 70% solution of zinc chloride in water, 424 parts water, and 76 parts 97% calcium chloride. The mixture was stirred to uniformity and an amber fluid was obtained which had a density of 1.315 g./ml. at 25° C.

EXAMPLE IV 93 parts by weight of the product of Example I was heated to 140° C. with agitation and 177 parts of a 3 mole ethylene oxide adduct of dimethylamine added in portions over a 1 hour period. The reaction mass was cooled to 110° C. and 50 parts water added. Heating was applied and the reaction mass held at reflux (112–116° C.) for 5 hours, at which time 50 parts water was added and the mixture neutralized to a pH of approximately 6 with 35 parts 30% hydrochloric acid.

EXAMPLE V 26 parts by weight of the product of Example IV was stirred to uniformity with 50 parts 70% zinc chloride in water, 47 parts water, and 10 parts calcium chloride.

EXAMPLE VI 176 parts by weight of the product of Example I was heated to 150° C. with agitation and 251 parts of a 5 mole ethylene oxide adduct of dimethylamine was added over a 1 hour period. The temperature was held at 128° C. for 4 hours, after which 100 parts water was added and the reaction mixture neutralized to a pH of about 6 with 29 parts 30% hydrochloric acid.

EXAMPLE VII 121 parts by weight of the product of Example VI was heated with 65 parts of 25% trimethylamine in water in a pressure vessel with agitation for 16 hours at 100° C. 549 parts of this product was neutralized to a pH of about 6 with 24 parts 30% hydrochloric acid.

EXAMPLE VIII 28 parts by weight of the product of Example VII was stirred to uniformity with 50 parts of 70% aqueous zinc chloride, 47 parts water, and 10 parts 79% calcium chloride.

EXAMPLE IX 42 parts by weight of the product of Example I was heated with 81 parts of 7 mole ethylene oxide adduct of dimethylamine and 59 parts 25% aqueous trimethylamine in a pressure vessel with agitation for 16 hours at 100° C. 515 parts of this product was neutralized to a pH of about 6 with 51 parts 30% hydrochloric acid.

EXAMPLE X 26 parts by weight of the product of Example IX was stirred to uniformity with 50 parts of 70% aqueous zinc chloride, 47 parts water, and 10 parts 97% calcium chloride.

EXAMPLE XI 70 parts by weight of the product of Example I was heated with agitation to 145° C. and 199 parts of a 7 mole ethylene oxide adduct of dimethylamine was added over a 30 minute period. The reaction mass was held at 130° C. to 140° C. for 4 hours and 50 parts water added. Heating was continued at reflux (112° C.) for an additional 2 hours. 50 parts water was added and the reaction mass neutralized to a pH of approximately 6 with 32 parts 30% hydrochloric acid.

EXAMPLE XII 29 parts by weight of the product of Example XI was stirred to uniformity with 50 parts 70% aqueous zinc chloride, 46 parts water, and 10 parts 96% calcium chloride.

EXAMPLE XIII 35 parts by weight of the product of Example I was heated with 99 parts of an 11 mole ethylene oxide adduct of dimethylamine and 46 parts 25% aqueous trimethylamine in a pressure vessel with agitation for 16 hours at 100° C. 526 parts of this product was neutralized to a pH of about 6 with 39 parts 30% hydrochloric acid.

EXAMPLE XIV 29 parts by weight of the product of Example XIII was stirred to uniformity with 50 parts 70% aqueous zinc chloride, 46 parts water, and 10 parts 96% calcium chloride.

EXAMPLE XV

The product of Example III was used in breaking oil-in-water petroleum emulsions from different oil fields. An oil-in-water petroleum emulsion from an oil field in the western part of the United States was treated at ambient temperature with 500 p.p.m. of the composition of Example III with agitation and broke the emulsion in 20 minutes. A fair treat was obtained in 5 minutes and a good treat in 10 minutes. The same procedure was applied to an oil-in-water petroleum emulsion from a different west coast oil field with substantially the same results.

EXAMPLE XVI

The composition described in Example III was added to a 100 cc. sample of an oil-in-water petroleum emulsion from a west coast oil field in varying proportions and the resultant emulsion was shaken at ordinary temperature 50 times and then 25 times at a temperature of 125° F. The proportions used were 100 p.p.m., 200 p.p.m., 400 p.p.m., 600 p.p.m., 800 p.p.m., 1000 p.p.m. and 1400 p.p.m. Some breaking of the emulsion occurred at 100 p.p.m.; the results at 200 p.p.m., 400 p.p.m. and 600 p.p.m. were fair; the results at 800 p.p.m. were good, and the results at 1000 and 1400 p.p.m. were excellent.

EXAMPLE XVII

A petroleum oil-in-water emulsion which was completely opaque with oil was treated at ambient temperature (70° F.) with 150 p.p.m. of the composition of Example III and after allowing the emulsion to stand for 24 hours, the water had separated and was completely clear.

EXAMPLE XVIII

A 100 cc. sample of a petroelum oil-in-water emulsion was taken directly from an oil field and tested after it was about one hour old by adding thereto 150 p.p.m. of the composition of Example III. The resultant emulsion containing the added chemical was heated to 180° F. and given 25 shakes. Outstanding results in breaking the emulsion were obtained. The following day other samples of the same emulsion were treated with 160 p.p.m. and 200 p.p.m. of the composition of Example III with excellent results.

EXAMPLE XIX

A series of compositions was prepared by reacting different proportions of quaternizing agent with the polyepichlorohydrin of Example I. Six preparations, labelled A, B, C, D, E and F were prepared by using trimethylamine as the quaternizing agent in proportions of 0.17, 0.20, 0.25, 0.33, 0.50 and 0.80 mole of trimethylamine per mole of chlorine in the polyepichlorohydrin. It will be recognized that in the resultant products the polyepichlorohydrin is only partially quaternized.

A preparation G was made using a molar ratio of trimethylamine to chlorine in the polyepichlorohydrin of 1:1 to give a fully quaternized product.

Another composition H was prepared in a manner similar to G except that dimethylethanolamine was reacted with the polyepichlorohydrin in a molar ratio of 1:1.

A composition J was prepared by reacting the polyepichlorohydrin of Example I with both trimethylamine and a three mole adduct of ethylene oxide with dimethylamine in proportions corresponding to 0.5 mole of trimethylamine and 0.5 mole of said adduct per mole of chlorine in the polyepichlorohydrin, thereby producing a fully quaternized polyepichlorohydrin.

These compositions were all prepared in the form of aqueous solutions containing 25% solids. Composition J gave a completely bright solution. The others exhibited various amounts of haze.

Zinc chloride was added to each of the foregoing compositions in ratios of 2.5 parts by weight of zinc chloride per part by weight of polymer solids. Compositions A through F separated with a trend from a very ragged floc to a dense viscous sediment, thereby illustrating the incompatibility of the partially quaternized compositions with the zinc chloride solutions. Compositions G, H and J gave solutions of greater clarity than the original solutions when mixed with zinc chloride, thereby showing compatibility.

In a similar manner, other compositions falling within the scope of the invention can be prepared and employed for breaking oil-in-water emulsions. The treatment of such emulsions can be carried out at atmospheric pressure and at atmospheric or ambient temperature, or with heating the emulsion to temperatures ordinarily not higher than 180° F. The preferred treating temperatures is within the range of 80–180° F. The ratio of the active demulsifying chemical to the emulsion on a weight basis usually will be within the range of 10 to 2000 parts per million parts of the emulsion. Optimum temperatures and amount of treating chemical for a particular emulsion can be determined by preliminary laboratory routine. When the emulsion breaks, the water and oil phases separate and can be recovered in any suitable manner, for example, by decantation or by drawing off one phase from the other. The proportions of the emulsion breaking composition will usually vary depending on the oil content of the emulsion. In most cases the oil content in reversed petroleum emulsions is within the range of 2% to 30% by weight.

As previously indicated, the active demulsifier made by quaternizing the polyepichlorohydrin with a water soluble tertiary amine of the type previously described should be compatible with solutions of zinc chloride in water. These solutions are most stable when the weight ratio of zinc chloride to polymer solids is at least 2.5:1. In general, the concentrations of zinc chloride in aqueous solution can vary from 10% to saturation. For economic reasons it is sometimes desirable to replace part of the zinc chloride, for example, up to 50% by weight, with calcium chloride. The use of calcium chloride gives a lower freezing point. In some cases, the inorganic salt solution can contain calcium chloride as the sole inorganic salt. Aluminum chloride can also be used, usually in proportions of 10% by weight or more, either alone or in conjunction with other inorganic salts. Examples of such other salts are magnesium chloride, and the highly water soluble iron salts, such as $FeSO_4$, $FeCl_3$ and $Fe(NO_3)_3$.

The solutions of the treating chemicals of the invention may contain additional compounds. For example, the aqueous solutions heretofore set forth in the description of the invention and in the specific examples thereof may contain 3–10 volume percent methanol, ethanol, ethylene glycol or the like antifreeze agents to help prevent the solutions from freezing at low temperature and to serve as a viscosity controlling agent at low temperatures. It is also advantageous to add a corrosion inhibitor to the solutions containing zinc chloride or other corrosive salts. An example of such a corrosion inhibitor is thiourea, which is added to the solutions in an amount in the range of 0.3–0.8% by weight.

The invention provides new and useful polyelectrolytes and new and useful blends of such polyelectrolytes with inorganic salts which are particularly effective for breaking oil-in-water emulsions. These polyelectrolytes are especially advantageous due to their high solubility in water and their compatibility with aqueous inorganic salt solutions, particularly aqueous solutions of zinc chloride.

The invention is hereby claimed as follows:

1. A process for breaking an oil-in-water emulsion which comprises mixing said emulsion with an adduct having the following formula:

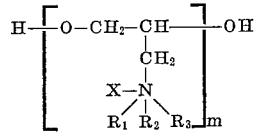

wherein X is halogen, $R_1$, $R_2$ and $R_3$ are methyl, ethyl or $H(OC_nH_{2n})_y$; $y$ is 1 to 30, $n$ is 2 to 4, and $m$ is a value sufficient to give a liquid product soluble in an aqueous solution zinc chloride containing 10% zinc chloride, in amounts effective to break said emulsion, and resolving the broken emulsion into its water and oil phases.

2. A process as claimed in claim 1 wherein said adduct is mixed with water containing a water soluble inorganic salt of a metal, the amount of said water soluble inorganic salt being within the range from 10% by weight to saturation in the resultant solution.

3. A process as claimed in claim 2 in which said water soluble inorganic salt is zinc chloride.

4. A process as claimed in claim 3 in which the weight ratio of zinc chloride to said adduct is at least 2.5:1.

5. A process as claimed in claim 1 in which $m$ in the general formula for said adduct is within the range of 30 to 80.

6. A process as claimed in claim 1 in which $n$, in the general formula for said adduct, is 2.

7. A process as claimed in claim 1 in which X in the general formula of said adduct is chlorine.

8. A process as claimed in claim 1 in which in the general formula of said adduct at least one of the radicals $R_1$, $R_2$ and $R_3$ is methyl and at least one other of said radicals is $H(OC_nH_{2n})_y$, where $n$ is 2 and $y$ is 1 to 30.

9. A process as claimed in claim 1 in which, in the general formula of said adduct, two of the radicals $R_1$, $R_2$ and $R_3$ are methyl.

10. A process as claimed in claim 1 in which, in the general formula of said adduct, the radicals $R_1$, $R_2$ and $R_3$ are all methyl and X is chlorine.

11. A process as claimed in claim 1 in which, in the general formula of said adduct, $m$ is 30 to 80, X is chlorine, two of the radicals $R_1$, $R_2$ and $R_3$ are methyl and the third is $H(OC_nH_{2n})_y$, where $n$ is 2 and $y$ is 1 to 30.

12. A composition consisting essentially of a fully quaternized adduct of a polyepihalohydrin and a tertiary amine having the following general formula:

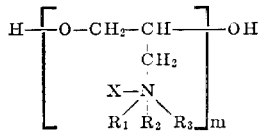

wherein X is halogen, $R_1$, $R_2$ and $R_3$ are methyl, ethyl or $H(OC_nH_{2n})_y$; $y$ is 1 to 30, $n$ is 2 to 4, and $m$ is a value sufficient to give a liquid product soluble in an aqueous solution zinc chloride containing 10% zinc chloride, and water in which is dissolved in amounts from 10% by weight to saturation an inorganic salt of a metal, the weight ratio of said metal salt to said adduct being at least 2.5:1.

13. A composition as claimed in claim 12 in which said inorganic salt is zinc chloride.

References Cited
UNITED STATES PATENTS

| | | | |
|---|---|---|---|
| 2,589,201 | 3/1952 | Monson | 252—329 |
| 3,205,169 | 9/1965 | Kirkpatrick et al. | 252—344 |

JOHN D. WELSH, Primary Examiner

U.S. Cl. X.R.

252—331